United States Patent [19]
Okamura

[11] Patent Number: 5,099,368
[45] Date of Patent: Mar. 24, 1992

[54] METHOD OF ACCESSING A MEDIUM WITH LOW POWER CONSUMPTION AND A RECORDING/REPRODUCING APPARATUS FOR REALIZING THE SAME

[75] Inventor: Hiroshi Okamura, Tokyo, Japan

[73] Assignee: Kabushiki Kaisha Toshiba, Kawasaki, Japan

[21] Appl. No.: 394,471

[22] Filed: Aug. 16, 1989

[30] Foreign Application Priority Data
Aug. 30, 1988 [JP] Japan .................... 63-215602

[51] Int. Cl.⁵ .................... G11B 5/55; G11B 15/12
[52] U.S. Cl. .................... 360/78.040; 360/61; 360/73.30; 360/78.130
[58] Field of Search ............. 360/60, 69, 78.04, 78.13, 360/46, 61, 48, 67, 68, 75, 137, 73.03, 73.06, 73.07; 369/32, 33, 41, 233

[56] References Cited
U.S. PATENT DOCUMENTS
4,688,112  8/1987  Shoji et al. .................... 360/60
4,700,243 10/1987  Tsuyuguchi et al. .................... 360/69
4,709,279 11/1987  Sano et al. .................... 360/69

OTHER PUBLICATIONS
Toshiba Review 1988 vol. 43 No. 5, pp. 425-428 "3.5-Inch 4-M Byte Ba-Ferrite Floppy Disk and Drive Equipment".

Primary Examiner—Aristotelis Psitos
Assistant Examiner—Steven R. Garland
Attorney, Agent, or Firm—Oblon, Spivak, McClelland, Maier & Neustadt

[57] ABSTRACT

A medium access apparatus having low power consumption includes a head driving section, an access section, a power supply section and a control signal generating section. When a medium is rotated, the head driving section causes a head to seek a destination track on the medium in accordance with an input drive signal including step pulses, the number of step pulses corresponding to a number of tracks from a current track, where the head positions, to the destination track. The access section accesses the medium through the head when power is supplied to the access section. The power supply section supplies the power to the access section and stopping the supply of the power in accordance with an input switch control signal. The control signal generating section selectively generates and outputs the switch control signal to the power supply section in accordance with the number of step pulses of the drive signal.

12 Claims, 4 Drawing Sheets

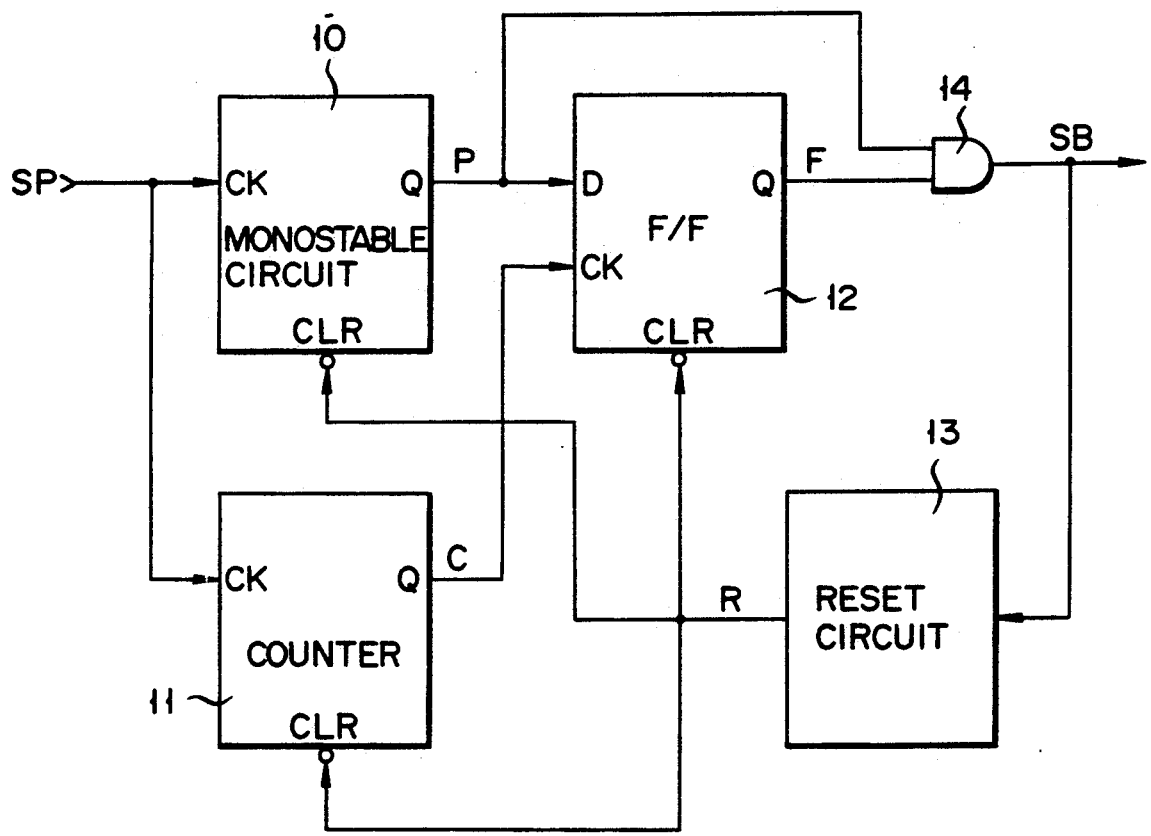
F I G. 2

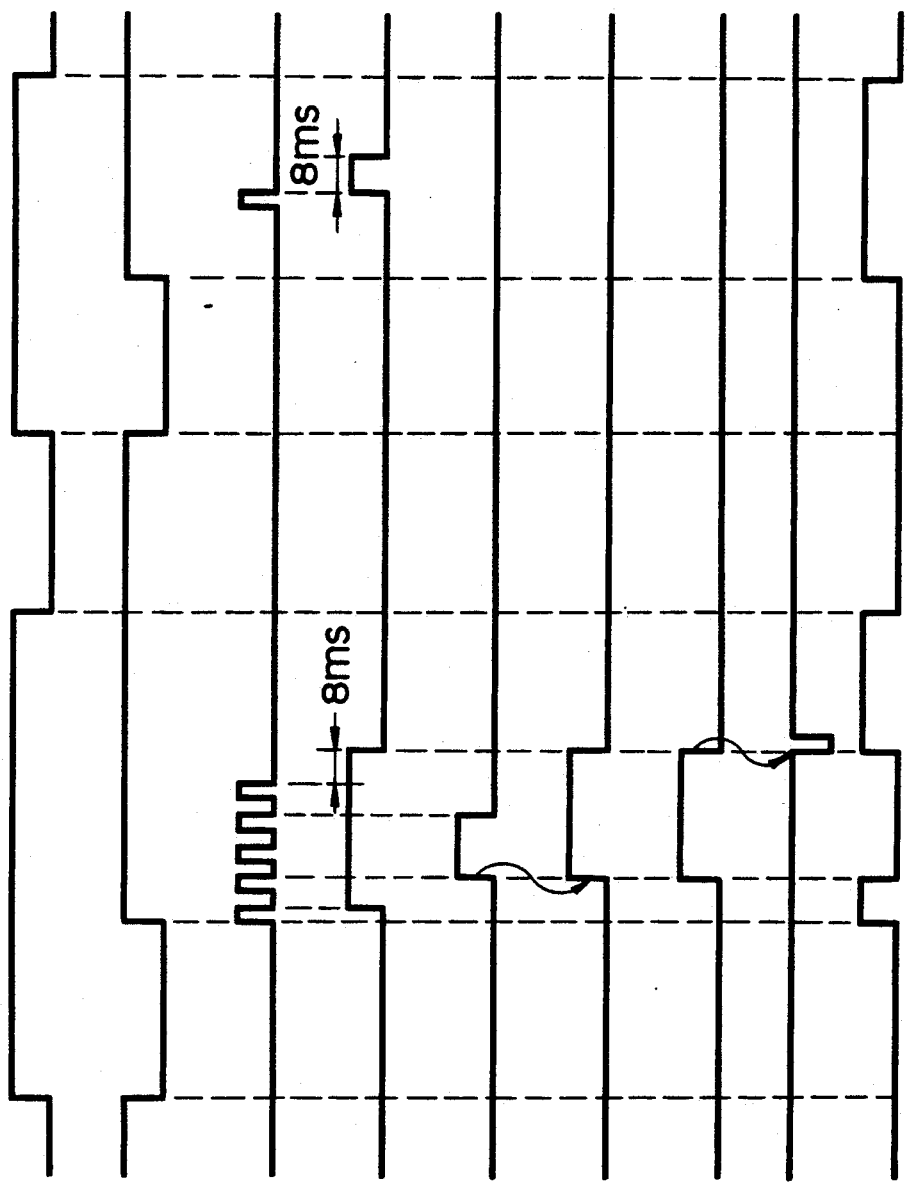
FIG.4A SIGNAL M
FIG.4B SIGNAL A
FIG.4C SIGNAL SP
FIG.4D SIGNAL P
FIG.4E SIGNAL C
FIG.4F SIGNAL F
FIG.4G SIGNAL SB
FIG.4H SIGNAL R
FIG.4I SIGNAL SC

METHOD OF ACCESSING A MEDIUM WITH LOW POWER CONSUMPTION AND A RECORDING/REPRODUCING APPARATUS FOR REALIZING THE SAME

BACKGROUND OF THE INVENTION

1. Field of the Invention

The present invention relates to a method of accessing a medium with low power consumption by means of standby function and a recording/reproducing apparatus for realizing this method.

2. Description of the Related Art

Conventional recording/reproducing apparatuses such as floppy disk drives have a standby function, as is disclosed in U.S. Pat. Nos. 4,700,234 and 4,688,112, both issued in 1987. In these apparatuses, after the power switch has been turned on, no power is supplied to the read/write circuit until the rotational speed of the spindle motor for rotating magnetic recording medium rotates reaches a predetermined value after the spindle motor starts rotation in response to a read or write command. In addition, no power is supplied to the read/write circuit whenever the magnetic heads seeks a destination track on the recording medium in response to the seek command. As a result, power consumption is reduced.

Typical recording/reproducing apparatuses have two magnetic heads, S0 and S1, disposed one above the other and facing each other, both being supported by a carriage. At the time the heads is subject to a seek operation, the carriage is moved in the radial direction of a magnetic recording medium; actually, the magnetic heads are moved by a head driving mechanism (carriage driving mechanism) using a stepping motor, by the distance corresponding to the number of step pulses supplied from a floppy disk controller (FDC) to the stepping motor (i.e., by the number of tracks). Normally, the magnetic heads are moved by one track with respect to a 1 step pulse, for example. When the 1 step pulse is output to the stepping motor from the FDC to move the magnetic heads to an adjacent track, therefore, the standby state will always be set and the power supply to the read/write circuit will be stopped.

However, in this standby system, after an adjacent track is sought as a destination track, the magnetic head accesses to this track for a read/write operation, access to a sector immediately upon completion of the seek operation may not be possible. As a result, the apparatus cannot access the medium until that sector makes one revolution. According to a format of tracks on the magnetic recording medium, gap areas GAP exist between sectors, with GAP 3, GAP 4, and GAP 0 normally existing between the head or first sector and the last or 36th sector. Each gap area corresponds to a rotational time of approximately 11 ms for a 1-MB magnetic recording medium, approximately 6.3 ms for a 2-MB type, and approximately 5.4 ms for a 4-MB type. The standby time (time for stopping the current supply from the power supplier) is set to, for example, around 8 ms (which is longer than the interval between step pulses) after a step pulse is output. Therefore, in a case of a low-recording density recording medium, such as a 1-MB type, data can be read from the first sector of an adjacent track subsequent to the last sector of a current track after the adjacent track is sought. However, when a relatively high-recording density recording medium, such as a 2-MB or 4-MB type is used, a wait state for one rotation occurs after an adjacent track is sought. Specifically, in the case where a file extending over two adjacent tracks is recorded on a magnetic recording medium, data is read out from the last sector of the first track by the magnetic head S1, then data is read out from the first sector of the second track by the magnetic head S0. In such a case, the FDC outputs one step pulse to the stepping motor to permit the associated magnetic head to seek the adjacent, second track after data is read out from the 36th sector of the first track. Then, the next data is read out from the first sector of the second track.

According to the conventional standby system, in executing a consecutive read/write operation over adjacent two tracks, a time loss corresponding to one rotation of the magnetic recording medium is generated when the read/write operation is carried out after seeking the adjacent tracks by the associated magnetic head.

SUMMARY OF THE INVENTION

Accordingly, it is an object of this invention to provide a medium access apparatus or a recording/reproducing apparatus which can surely affect a standby function and can eliminate a waiting time corresponding to one rotation of a magnetic recording medium when a consecutive data read/write operation is performed over adjacent two tracks, thus shortening the overall time for the read/write operation.

In order to achieve the object, a medium access apparatus includes a head driving section, as access section including a head for accessing a medium, a power supply section and a control signal generating section. When a medium is rotated, the head driving section causes the head to seek a destination track on the medium in accordance with an input drive signal including step pulses, the number of step pulses corresponding with a predetermined ratio to a number of tracks from a currently positioned track of the head, to the destination track. The access section accesses the medium through the head when power is supplied to the access section. The power supply section supplies the power to the access section and stopping the supply of the power in accordance with an input switch control signal. The control signal generating section selectively generates and outputs the switch control signal to the power supply section in accordance with the number of step pulses of the drive signal.

In order to achieve another object, a method of accessing a medium with low power consumption comprises the steps of:

generating a drive signal in response to a seek instruction, the drive signal including step pulses, the number of step pulses corresponding to a number of tracks from a current rack to the destination track to be sought, the medium being rotated, selectively generating a switch signal in accordance with the number of step pulses of the drive signal, supplying power to access means in accordance with the switch control signal, seeking the destination track on the medium by head means in accordance with the drive signal, and accessing the medium by the access means through the head means when the power is supplied to the access means.

As described above, according to this invention, a recording/reproducing apparatus for stopping the supply of power necessary for a read/write operation under given conditions such as a seek operation by a magnetic head, can ensure a standby function and can execute a read/write operation immediately after a seek operation when a consecutive data read/write operation is carrier out over adjacent two tracks. This can eliminate the otherwise probable generation of a waiting timing corresponding to one rotation of a magnetic recording medium after a seek operation, thus shortening the time for the read/write operation.

BRIEF DESCRIPTION OF THE DRAWINGS

FIG. 2 is a block diagram illustrating the configuration of a standby signal generator;

FIGS. 4A through 4I are timing charts for explaining the operation of the same embodiment.

DETAILED DESCRIPTION OF THE PREFERRED EMBODIMENTS

A floppy disk recording/reproducing apparatus as an example of the present recording/reproducing apparatus will now be described in detail referring to the accompanying drawings.

Figure 1:
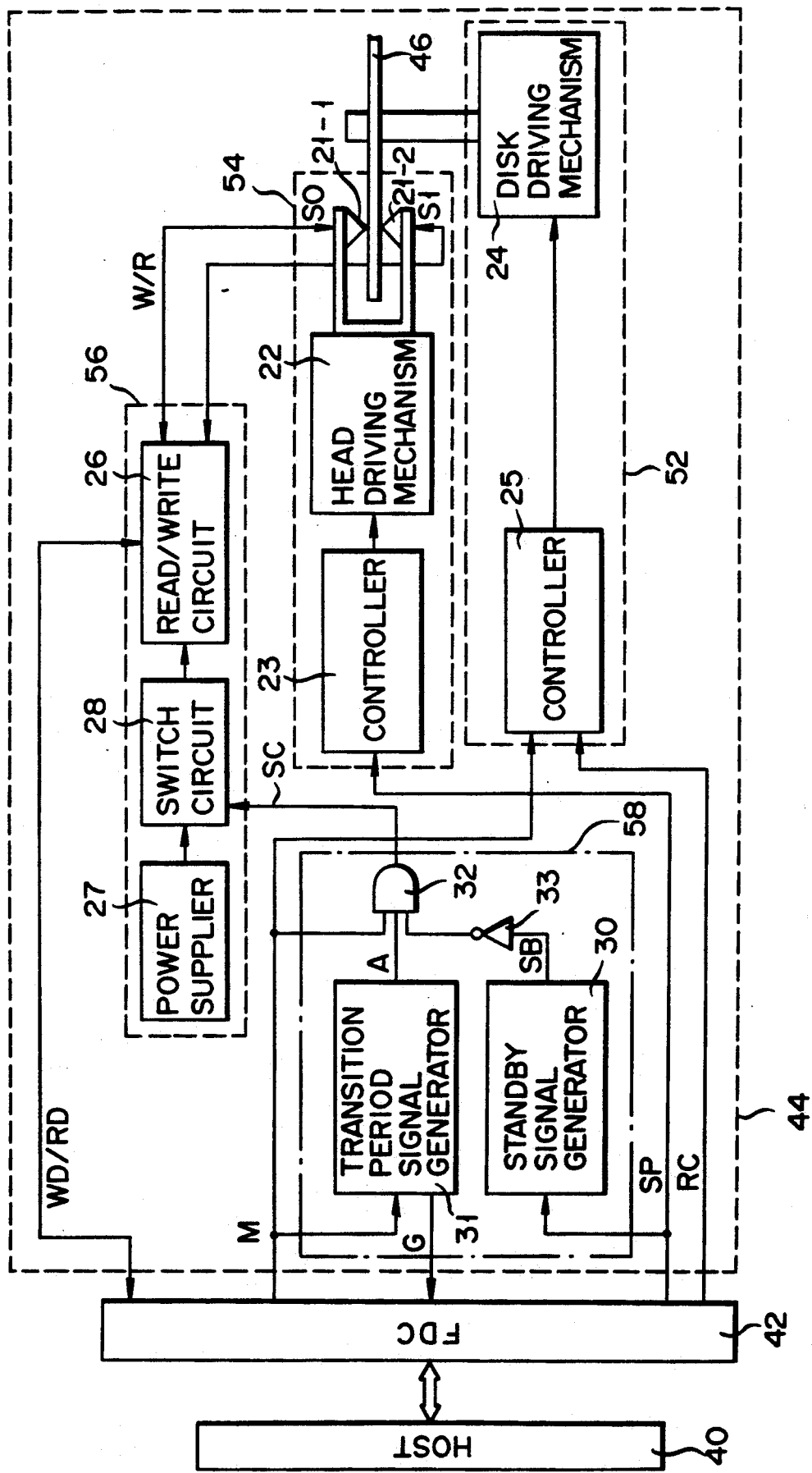
FIG. 1 is a block diagram illustrating the arrangement of a recording/reproducing apparatus according to one embodiment of this invention.
Figures 3A, 3B:
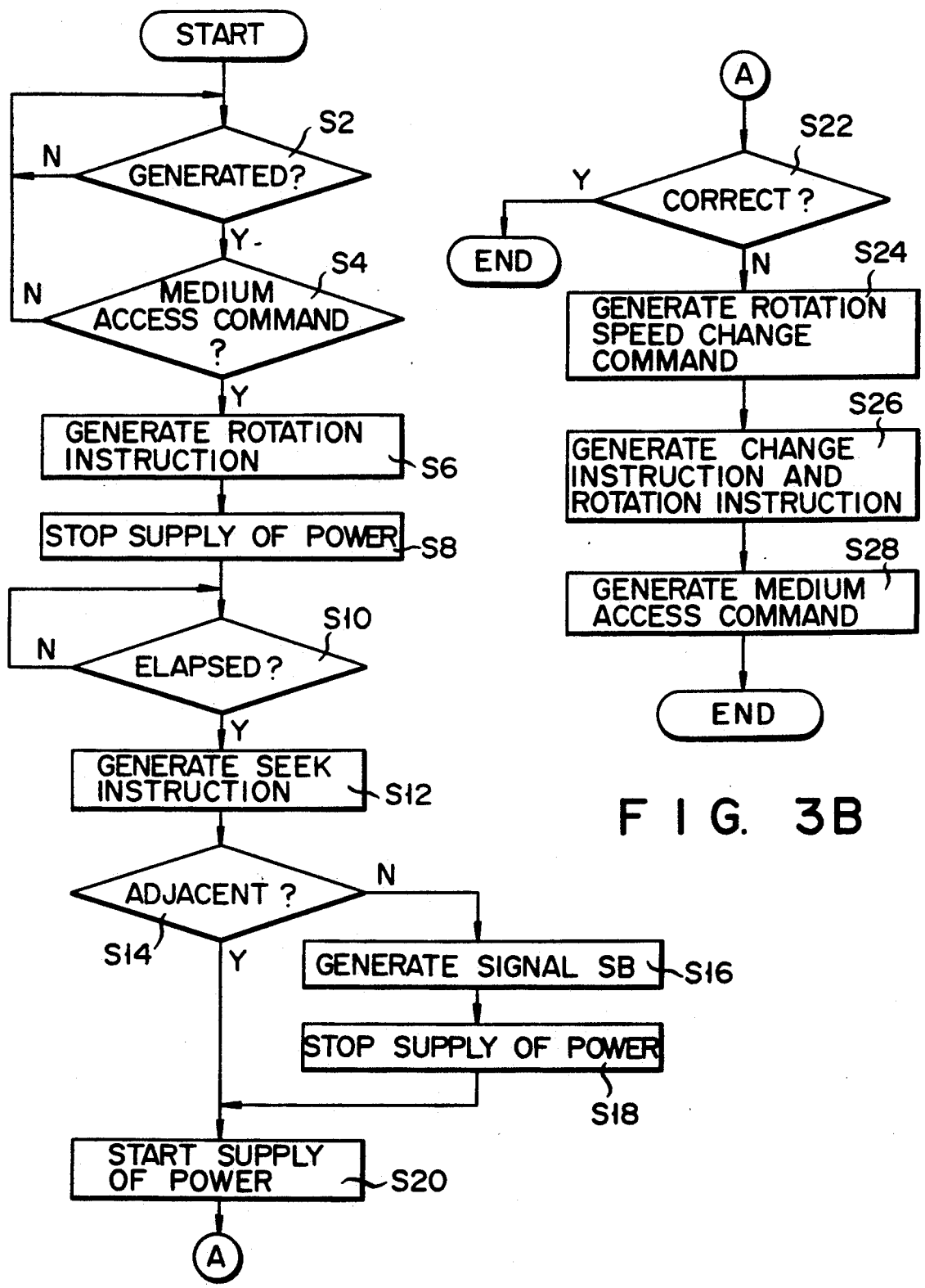
FIGS. 3A and 3B are flowcharts for explaining the operation of the embodiment.

First, a description will be given of the arrangement of the recording/reproducing apparatus referring to FIG. 1. The recording/reproducing apparatus includes a host computer 40, a floppy disk controller (FDC) 42 and a plurality of floppy disk drives (FDDs) 44. FIG. 1 shows only one FDD 44. The host computer 40 generates a medium access command. When data is not accurately read out from a recording medium 46, the computer 40 discriminates that the rotation speed of the medium 46 is not proper, so that it generates a rotation speed change command. The generated command is output to the FDC 42. The host computer 40 receives data from the FDC 42 when the medium access command includes a read command, and outputs write data to the FDC 42 when the medium access command includes a write command.

In response to the medium access command, the FDC 42 generates a motor ON signal M as a medium rotate command, in addition to a read instruction or a write instruction, and outputs the signal M to the FDD 44. In accordance with the medium access command, the FDC 42 selectively generates a seek instruction and outputs a step pulse signal SP as the seek instruction, to the FDD 44. Further, in response to the rotation speed change command, the FDC 42 generates a signal RC and the signal M and output them to the FDD 44.

The FDD 44 has a disk driving section 52, a head driving system 54, a read/write section 56 and a switch control signal generation section 58. The disk driving mechanism 24 rotates the magnetic recording medium or disk 46 at a predetermined rotation speed. The rotation speed is 300 rpm or 360 rpm. The disk driving section 52 includes a disk driving mechanism 24 and a controller 25 for controlling the mechanism 24 in accordance with the input signal M or RC. The disk driving mechanism 24 has a disk supporting mechanism (not shown) comprising a spindle motor (normally a DC brushless motor) and a spindle hub (neither shown), and rotates the disk 46 supported on the spindle hub. The controller 25 causes the spindle motor of the mechanism 24 to rotate the disk 46 with a currently-designated rotation speed in responses to the signal M from the FDC 29, the rotation speed being designated by the signal RC.

Magnetic heads 21-1 and 21-2 are provided respectively on the S0 and S1 sides. The head driving section 54 includes a head driving mechanism for causing the heads 21-1, 21-2 to seek a destination track on the disk 46 in the radial direction and a controller 23. The head driving mechanism 22 has a carriage and a carriage driving mechanism employing a stepping motor (none of them being shown), and moves the magnetic heads 21-1, 21-2 mounted on the carriage in the radial direction. The controller 23 drives and controls the stepping motor of the head driving mechanism 22 in accordance with the signal SP from the FDC 42. The magnetic heads 21-1, 21-2, coupled to a read/write circuit (R/W circuit) 26, executes a writing operation on the disk 46 in accordance with a write current W flowing from the R/W circuit 26 and outputs a read current R obtained by the reading operation on the disk 46 to the R/W circuit 26.

The read/write section 56 includes a power supplier 27, a switch circuit 28 and the R/W circuit 26. In accordance with an input switch control signal SC, the switch circuit 28 stops the supply of a current from the power supplier 27 to the R/W circuit 26 at the standby time, and permits the current supply to the R/W circuit 26 when the standby is released. The switch circuit 28 includes a transistor, for example, and performs its ON/OFF operation in accordance with the control signal SC from a switch control signal generator 58. The R/W circuit 26 outputs the write current to the magnetic heads 21-1, 21-2, which current is attained by modulation of the value of the current in accordance with write data signal WD during a period in which a write gate signal is output from the FDC 42 in response to the write instruction. Further, the R/W circuit 26 reproduces the read current R from the magnetic head 21 into read data signal RD in response to the read instruction from the FDC 42, and outputs it to the FDC 42.

The switch control signal generator 58, which serves to perform the standby function of this invention, has a standby signal generator 30, a transition period signal generator 31, an AND gate 32 and an inverter 33. The signal generator 31 is activated in synchronism with the signal M from the FDC 42, and generates a transition period signal A of logic "L" to the AND gate 32 until elapse of a predetermined time 380 ms, for example. Thereafter, the signal generator 31 generates the transition period signal A of logic "H" and a ready signal G when the predetermined time is elapsed. A transition period, from a time when the spindle motor of the disk driving mechanism 24 is activated to a time when the motor reaches a constant rotation speed, is within the predetermined time. The signal generator 31 outputs the signal A to the AND gate 32 and the ready signal G to the FDC 42.

Upon reception of the medium access command, the FDC 42 generally generates the read instruction or the write instruction and the seek instruction in response to the ready signal G. The standby signal generator 30 generates a signal SB in response to the signal SP, and outputs it to the AND gate 32 via the inverter 33. The signal M is also supplied to the AND gate 32. The AND gate 32 obtains a logical AND operation of the received signals M, SB and A and outputs the operation resultant as the signal SC to the read/write section 56.

The configuration of the standby signal generator 30 will now be described in detail with reference to FIG. 2. The generator 30 includes a re-triggerable monostable multivibrator (hereinafter referred to as a monostable circuit) 10, a counter 11, a D flip-flop (hereinafter referred to as F/F) 12, a reset circuit 13 and an AND gate 14. The monostable circuit 10 generates a pulse P of a predetermined pulse width, for example, 8 ms, in synchronization with the falling of the each step pulse signal SP, and outputs it to the F/F 12 and AND gate 14. The signal SP is also supplied to the counter 11.

The counter 11 counts the number of pulses in the signal SP and outputs a signal C to the F/F 12 when the count value reaches 2. The F/F 12 sets the signal P from the monostable circuit 10 in synchronization with the signal C from the counter 11 and outputs a signal F to one input terminal of the AND gate 14. The AND gate 14 has the other input terminal supplied with the signal P from the monostable circuit 10, and executes a logical AND operation of the signals P and F. The AND gate 14 outputs the computation result as the signal SB to an AND gate 32 via the inverter 33. The reset circuit 13 generates a reset signal R in synchronization with the falling of the signal SB and resets the monostable circuit 10, counter 11 and F/F 12.

A description will now be given of the operation of the same embodiment referring to FIGS. 3A, 3B and 4A through 4I. After main power is given to the FDD, the head driving system and disk driving section each become ready for an operation. In steps S2 and S4 it is determined whether or not a medium access command has been issued. When the medium access command is generated, a rotation instruction is generated by the FDC 42 and the signal M as the rotation instruction is supplied to the transition period signal generator 31 and controller 25 in step S6.

The signal M is at a logical level "L" until the medium access command is input, as shown in FIG. 4A, so that power from the power supplier 27 has not been supplied to the R/W circuit 26 yet. When the signal M becomes a logical level "H", the controller 25 is activated to drive the spindle motor of the disk driving mechanism 24. This causes the disk 46, set in the disk driving mechanism 24, to be rotated at a rotation speed currently designated. Since the generator 31 does not output the signal A of a logical level "L" until a predetermined transition period elapses after the signal M has risen, as shown in FIG. 4B, the AND gate 32 outputs the control signal SC of a logical level "L" as shown in FIG. 4I, in step S8. Accordingly, the switch circuit 28 is in an OFF state and stops power supply to the R/W circuit 26. That is, the R/W circuit 26 is in a standby state. The transition period is set longer than a time required for the disk 46 to reach its normal speed after its rotation has started.

When it is discriminated in step S10 that the transition period has elapsed, the signal A goes to a logical level "H" as shown in FIG. 4B, and a ready signal G is generated and output to the FDC 42. The signal SC also goes to a logical level "H" as shown in FIG. 4I in accordance with the signal A, thus permitting the power from the power supplier 27 to be supplied to the R/W circuit 26.

In the subsequent step S12, the signal SP as the seek instruction for permitting the magnetic heads 21-1, 21-2 to seek the destination track on the disk 46 is generated in response to the ready signal G, and is output to the standby signal generator 30 and controller 23. Assume that the magnetic head 21-1 is caused to seek the destination track at a distance corresponding to five tracks. At this time, the FDC 42 outputs the signal SP including five pulses, as shown in FIG. 4C each pulse being consecutively output within 8 ms from a preceding pulse. The controller 23 controls the stepping motor of the head driving mechanism 22 in accordance with the number of the step pulses in the signal SP, and moves the magnetic head 21 from the current track on the disk 46 to the destination track by five tracks.

In step S14, the standby signal generator 30 determines the number of tracks to the destination track. The monostable circuit 10 is triggered in synchronization with the falling of each step pulse as shown in FIG. 4C and outputs an 8-ms pulse. As shown in FIG. 4D, this pulse P falls 8 ms after the falling of the fifth step pulse. The duration of 8 ms of each pulse from the monostable circuit 10 is longer than the duration of the step pulse SP. The counter 11 counts the number of the step pulses in synchronization with the falling of each pulse.

When the count reaches 2, i.e., in synchronization with the falling of the second step pulse, the signal C is output to the clock terminal of the F/F 12 (see FIG. 4E). In synchronization with the signal C, the signal P from the monostable circuit 10 is set in the F/F 12 and the signal F as shown in FIG. 4F is output to the AND gate 14. The AND gate 14 outputs the signal F from the F/F 12 as the signal SB to the inverter 33 as shown in FIG. 4G while the monostable circuit 10 is outputting the signal P. More specifically, the signal SB is generated from the standby signal generator 30 in accordance with the number of step pulses in the signal SP and is output to the inverter 33, as shown in FIG. 4G, in step S16. The signal SB is at logic "H" during a period from a timing when the second pulse falls 21 to a timing when 8 ms is elapsed after the fifth pulse falls. Then, the signal R is generated in synchronization with the falling of the signal SB, as shown in FIG. 4H, thereby permitting the circuit 10, counter 11 and F/F 12 to be reset.

When the signal SB of a logical level "H" is output from the standby signal generator 30, it is inverted by the inverter 33 and the resultant signal of a logical level "L" is supplied to the AND gate 32. Consequently, the control signal SC of a logical level "L" (see FIG. 4I) is output to the switch circuit 28. This sets the switch circuit 28 in an OFF state to thereby stop the power supply to the R/W circuit 26 in step S18. That is, the R/W circuit 26 is in a standby state. When the standby signal SB falls down to the logical level "L," the control signal SC of a logical level "H" is output from the AND gate 32, thus switching the switch circuit 28 ON. That is, the standby state has been released, and the power will be supplied to the R/W circuit 26 in step S20. Accordingly, the R/W circuit 26 causes the magnetic head 21 to execute a read/write operation with respect to the destination track.

In executing a consecutive read/write operation over adjacent two tracks, the FDC 42 outputs the signal SP including only one step pulse as shown in FIG. 4C after the magnetic head 21-2 performs the read/write operation to the first track on the disk 46. As a result, the magnetic head 21-1 seeks the adjacent, second track in the above-described manner in accordance with the single step pulse. In this case the monostable circuit 10 of the standby signal generator 30 outputs the pulse P having a pulse width of, for example, 8 ms as shown in FIG. 4D, in synchronization with the single step pulse. Meantime, the counter 11 starts counting the number of the step pulse, but due to the single step pulse, the counter 11 does not outputs the signal C. This does not permit the F/F 12 to output the signal F, so that the AND gate 14 outputs the signal SB of a logical level "L" as shown in FIG. 4G. As a result, the "L"-level signal SB is inverted by the inverter 33 and the resultant signal is input to the AND gate 32. This permits the AND gate 32 to output the switch control signal SC having a logical level "H" to the switch circuit 28. The switch circuit 28 is therefore rendered ON and the standby state is released, thus permitting power supply to the R/W circuit 26 in step S20. When the magnetic heads 21-1, 21-2 seek the adjacent, second track, the R/W circuit 26 can cause these heads to carry out the read/write operation to the second track in the above-described manner.

For instance, if it is discriminated in step S22 that data acquired by a read operation executed to the disk 46 is inaccurate, a rotation speed change command is generated by the host computer 40 in step S24. In response to this command, the FDC 42 outputs a change instruction RC and a rotation instruction M to the FDD 44 in step S26. This alters the specified number of rotations of the disk 46, then starts rotation of the disk again at the altered speed. Thereafter, the medium access command is again generated in step S28, and the above-described sequence of operations will be repeated.

In this manner, in moving the magnetic head 21 by two or more tracks to the destination track, the signal SB is generated to permit the R/W circuit 26 to be in standby state. This significantly reduces the power consumption of the FDD. When the magnetic head 21 seeks the destination track adjacent to the current track, the standby state of the R/W circuit 26 is left released. Accordingly, in executing a consecutive read/write operation over adjacent two tracks, the R/W circuit 26 can execute a read/write operation even immediately after the magnetic head 21 has sought the adjacent track. In accessing the first sector of the second track after accessing the last sector of the adjacent first track, therefore, it is possible to prevent the head from waiting for the magnetic recording medium to spin once then accessing the first sector of the second track.

What is claimed is:

1. A medium access apparatus having low power consumption, comprising:
    a head;
    access means for receiving electrical power and reading data from and writing data to a medium by means of said head when the electrical power is supplied thereto, said medium being rotated;
    head driving means including a stepping motor for causing said head to seek a destination track on said medium, in accordance with an input drive signal including step pulses, a number of which corresponds to a number of tracks from a track at which said head is currently positioned, to the destination track;
    control signal generating means for indicating stopping of supplying of the electrical power to said access means when said head driving means drives said head more than a predetermined number of tracks and for generating a switch control signal in accordance with the number of step pulses of the input drive signal; and
    power supply means for supplying the electrical power to said access means to allow operation of the access means and stopping the supply of the electrical power to prevent operation of said access means in response to the switch control signal from said control signal generating means.

2. An apparatus according to claim 1, wherein said control signal generating means includes means for generating the switch control signal when the number of step pulses is more than 1.

3. An apparatus according to claim 1, wherein said control signal generating means includes:
    generating means for generating a first signal in response to the input drive signal, a duration time of the first signal being determined in accordance with the number of step pulses;
    counting means for counting the number of step pulses and generating a second signal when the counted number of step pulses reaches a predetermined value;
    latch means for latching the first signal in synchronism with the second signal; and
    gate means for performing a logical AND operation of the first and latched first signals and for outputting as the switch control signal a result of the logical AND operation to said power supply means.

4. An apparatus according to claim 3, wherein said generating means includes means for retriggerably generating a first pulse for every step pulse, and a time width of the first pulse is predetermined.

5. An apparatus according to claim 1, further comprising medium-driving means for rotating said medium in accordance with an input rotation instruction, and wherein said control signal generating means further comprises signal generating means for generating the switch control signal during a predetermined time period, in response to the rotation instruction.

6. An apparatus according to claim 5, further comprising control means for generating and outputting the rotation instruction to said medium-driving means and said signal generating means, in response to an input access command, and generating the drive signal after an elapse of the predetermined time period from when said control means outputs the rotation instruction to said signal generating means and said medium-driving means.

7. An apparatus according to claim 6, further comprising host means for generating the access command and generating and outputting a rotation speed change command to said control means when said host means determines in accordance with data from said medium through said access means that a rotation speed of said medium is not correct, and wherein said control means further comprises means for generating the rotation instruction and a change instruction in response to the rotation speed change command to output the rotation instruction to said signal generating means and said medium-driving means and the change instruction to said medium driving means, and said medium-driving means includes means for controlling the rotation speed of said medium in accordance with the change instruction.

8. A medium access apparatus having low power consumption, comprising:
    a head;
    medium access means for accessing a medium through said head when operation power is supplied to said medium access means;

seeking means for driving said head from a track on the medium to a destination track on the medium in accordance with an input seek instruction;

power supply means for supplying the operation power to said medium access means to allow operation of said medium access means; and supply control means responsive to the seek instruction, for inhibiting said power supply means from supplying the operation power to said medium access means when the destination track is more than a predetermined number of tracks away from a currently positioned track of said head and permitting the supply of the power to said medium access means by said power supply means when the destination track is equal or smaller than the predetermined number of tracks away from the currently positioned track.

9. An apparatus according to claim 8, wherein said supply control means inhibits supplying the power to said medium access means in accordance with the seek instruction and the seek instruction includes step pulses, said supply control means comprising:

determining means for counting a number of step pulses and thereby determining a number of tracks to the destination track;

inhibiting means for inhibiting said power supply means from supplying the power to said medium access means when the number of tracks is determined to be plural; and means for permitting the supply of the power from said power supply means to said medium access means when the number of tracks is determined to be one.

10. An apparatus according to claim 8, further comprising medium rotating means for rotating said medium in accordance with an input rotation instruction, and wherein said supply control means further comprises means for inhibiting said power supply means from supplying the power during a predetermined time period in accordance with the rotation instruction.

11. An apparatus according to claim 10, further comprising control means responsive to an input access command, for generating and outputting the rotation instruction to said medium rotating means and said supply control means and generating and outputting the seek instruction to said supply control means and said medium access means when the predetermined period is elapsed after said control means generates the rotation instruction.

12. An apparatus according to claim 11, further comprising host means for generating and outputting a rotation speed change command to said control means when said host means determines from data from said medium through said medium access means that a rotation speed of said medium is not correct, and wherein said control means further comprises means for generating the rotation instruction and a change instruction and to output the rotation instruction to said supply control means and the change instruction to said medium rotating means in response to the rotation speed change command, and said medium rotating means further comprises means for rotating said medium at a rotation speed designated by the change instruction.

* * * * *